United States Patent [19]

Miyaoka et al.

[11] Patent Number: 6,069,852
[45] Date of Patent: May 30, 2000

[54] MAGNETO-OPTICAL RECORDING-REPRODUCING METHOD FOR RECORDING AN ASYMMETRICAL MAGNETIC DOMAIN ON A MAGNETO-OPTICAL RECORDING MEDIUM

[75] Inventors: Yasuyuki Miyaoka; Hiroshi Yoshida, both of Yokohama, Japan

[73] Assignee: Canon Kabushiki Kaisha, Tokyo, Japan

[21] Appl. No.: 09/111,280

[22] Filed: Jul. 7, 1998

[30] Foreign Application Priority Data

Jul. 8, 1997 [JP] Japan .................................... 9-182432

[51] Int. Cl.$^7$ ..................................................... G11B 11/00
[52] U.S. Cl. ............................................................. 369/13
[58] Field of Search .................................. 369/13, 14, 110, 369/116, 275.4; 360/59, 114; 365/122

[56] References Cited

U.S. PATENT DOCUMENTS 5,459,701 10/1995 Tokita et al. ................................ 369/13
5,555,236 9/1996 Hasegawa ................................ 369/116
5,740,133 4/1998 Tamanoi et al. ........................... 369/13

FOREIGN PATENT DOCUMENTS

6-290496 10/1994 Japan .

Primary Examiner—Tan Dinh
Attorney, Agent, or Firm—Fitzpatrick, Cella, Harper & Scinto

[57] ABSTRACT

A method for recording information on a domain wall displacement type magneto-optical medium comprises forming a magnetic domain such that the magnetic domain is asymmetrical with regard to a center line of a land portion or a groove portion in a tangential direction of the magneto-optical medium perpendicular to a radial direction of the magneto-optical medium. A method for reproducing information recorded by the method for recording information comprises projecting a light spot a center of which light spot, is positioned in one side of the land portion or the groove portion divided by the center line of the land portion or the groove portion from the other side, in which other side a curvature center of a domain wall of the magnetic domain exists, moving the light spot along the land portion or the groove portion, and reproducing information from the magnetic domain by a change of polarization direction of reflected light of the light spot.

5 Claims, 9 Drawing Sheets

MAGNETO-OPTICAL RECORDING-REPRODUCING METHOD FOR RECORDING AN ASYMMETRICAL MAGNETIC DOMAIN ON A MAGNETO-OPTICAL RECORDING MEDIUM

BACKGROUND OF THE INVENTION

1. Field of the Invention

The present invention relates to a magneto-optical recording-reproducing method comprising projecting a light beam onto a magneto-optical medium of a multi-layer structure having layers such as a memory layer and a displacement layer; displacing a domain wall of a record mark in the displacement layer without change of recorded data in the memory layer by utilizing a temperature gradient in a temperature distribution caused by light beam projection; and detecting a change of polarization direction of the reflected light beam to reproduce the record mark.

2. Related Background Art

Magneto-optical mediums for rewritable high-density recording are known which record information by forming magnetic domains in a magnetic thin film by thermal energy of a semiconductor laser and read out the information by utilizing a magneto-optical effect. In recent years, higher recording density of the magneto-optical medium is demanded. In an optical disk such as a magneto-optical medium, the linear recording density depends greatly on the laser wavelength and the numerical aperture of the objective lens of the reproducing optical system. Specifically, the laser wavelength $\lambda$ and the numerical aperture NA of the objective lens of the reproducing optical system decide the diameter of the beam waist, whereby the detectable range of the spatial frequency of record mark reproduction is limited to about $2NA/\lambda$. Therefore, for achieving higher recording density with a conventional optical disk, the laser wavelength should be shorter and the NA of the objective lens should be larger in the reproducing optical system. However, the improvements in the laser wavelength and the numerical aperture of the objective lens are limited naturally.

Figure 2A:
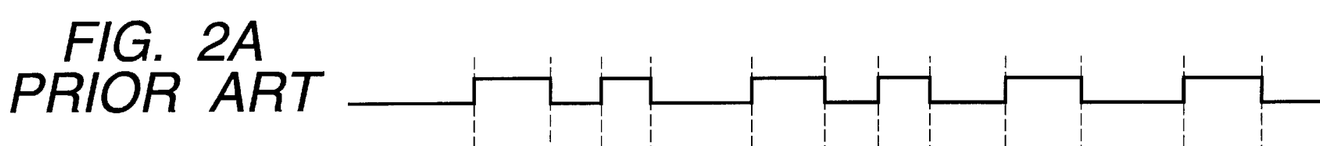
FIGS. 2A, 2B, 2C, 2D, 2E and 2F are timing charts for explaining operation of a conventional magneto-optical recording-reproducing apparatus.
Figure 2B:
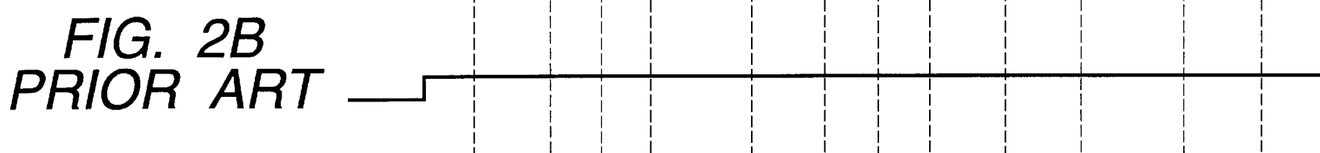
Figure 2C:
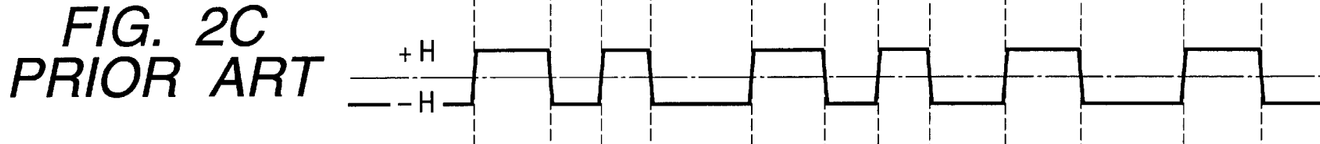

For a still higher recording density, the constitution of the recording medium and the reading method are being improved. For example, Japanese Patent Application Laid-Open No. 6-290496 discloses a signal-reproducing method and an apparatus therefor. This method records signals in a memory layer of a multi-layered film having a displacement layer and the memory layer coupled magnetically, and reproduces the record marks of less than the light diffraction limit of the optical system by displacing the domain walls of record marks in the displacement layer by utilizing a temperature gradient caused by irradiation of a heating light beam without changing recorded data in the memory layer, magnetizing uniformly and almost entirely the light beam-spotted region on the reproducing layer, and detecting the change of polarization direction of the reflected light beam. This method reproduces signals in a rectangle form as shown in FIG. 2E, which enables reproduction of record marks of a frequency of less than an optical diffraction limit of the optical system without decreasing the reproduction signal amplitude. Thereby, the medium and method for the magneto-optical recording are greatly improved in the recording density and the transfer speed.

Figure 1:
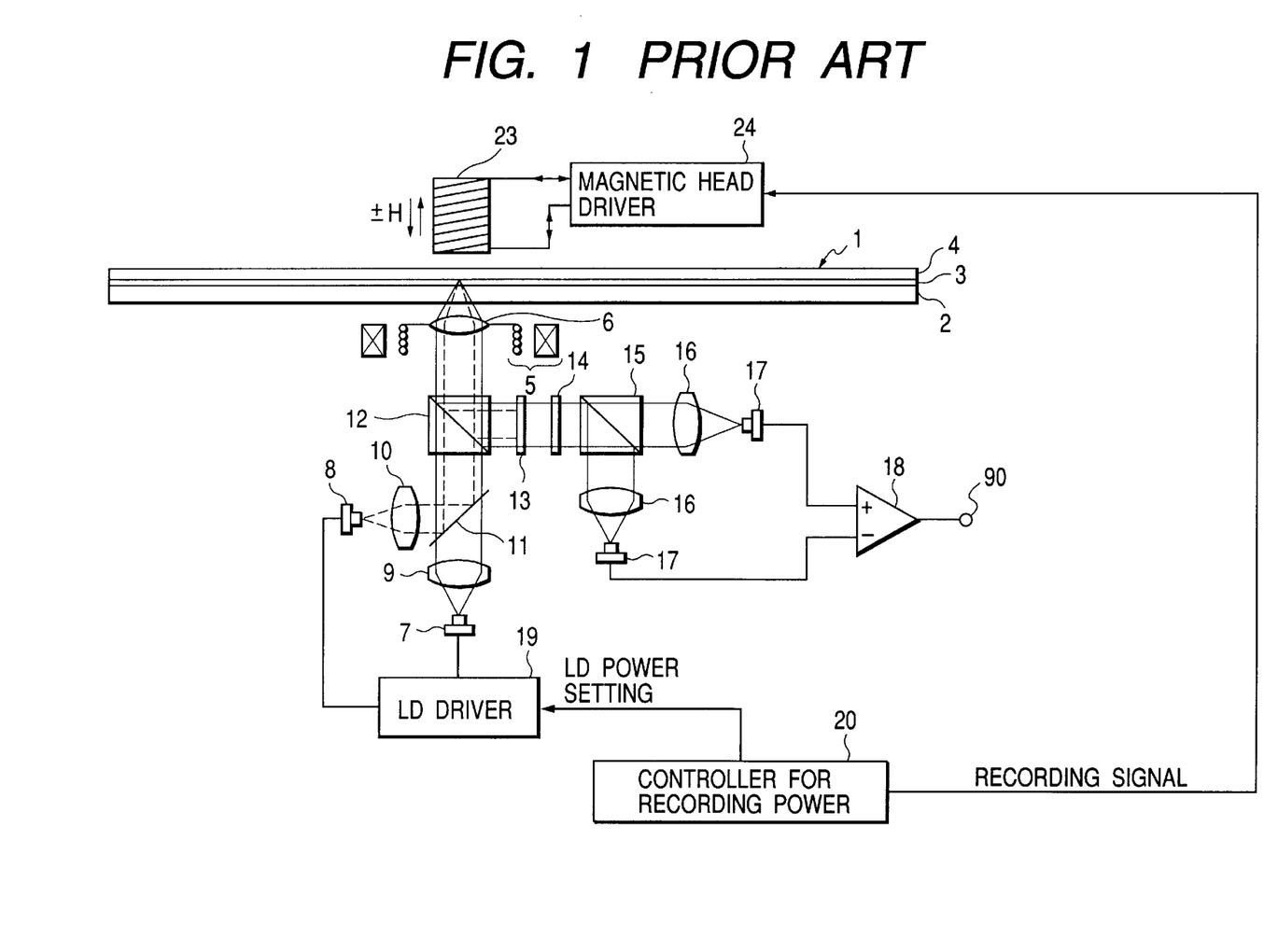
FIG. 1 shows a constitution of a conventional magneto-optical recording-reproducing apparatus.

FIG. 1 shows a constitution of a conventional system. In FIG. 1, magneto-optical disk 1 is constituted of substrate 2 magneto-optical layer 3 formed thereon, and protection layer 4 formed further thereon. Substrate 2 is formed from glass or a plastic material. Magneto-optical layer 3 is constituted of a multiple layer comprising at least a memory layer and a displacement layer, and is capable of reproducing record marks of less than an optical diffraction limit of the optical system by displacing a domain wall by utilizing a temperature gradient caused by light beam irradiation without changing recorded data in the memory layer, magnetizing uniformly and almost entirely the reproducing light beam-spotted region on the reproducing layer, and detecting the change of polarization direction of the reflected light beam. Magneto-optical disk 1 is set to a spindle motor by a magnet chucking or a like means to be rotatable on a rotation axis.

Parts 5 to 17 constitute an optical head for projecting a laser beam to magneto-optical disk 1 and for receiving information from reflected light. The parts comprise condenser lens 6 as an objective lens, actuator 5 for driving condenser lens 6, semiconductor laser 7 of a wavelength of 680 nm for record reproduction, semiconductor laser 8 of a wavelength of 1.3 $\mu$m for heating, collimator lenses 9,10, dichroic mirror 11 for completely transmitting light of 680 nm and completely reflecting light of 1.3 $\mu$m, beam splitter 12, dichroic mirror 13 for intercepting light of 1.3 $\mu$m and completely transmitting light of 680 nm to prevent leakage of light of 1.3 $\mu$m into the signal detecting system, $\lambda/2$ plate 14, polarized light beam splitter 15, photosensors 17, condenser lenses 16 for the photosensors, and differential amplification circuit 18 for differentially amplifying the condensed and detected signals for respective polarization direction.

Figures 3A, 3B, 3C:
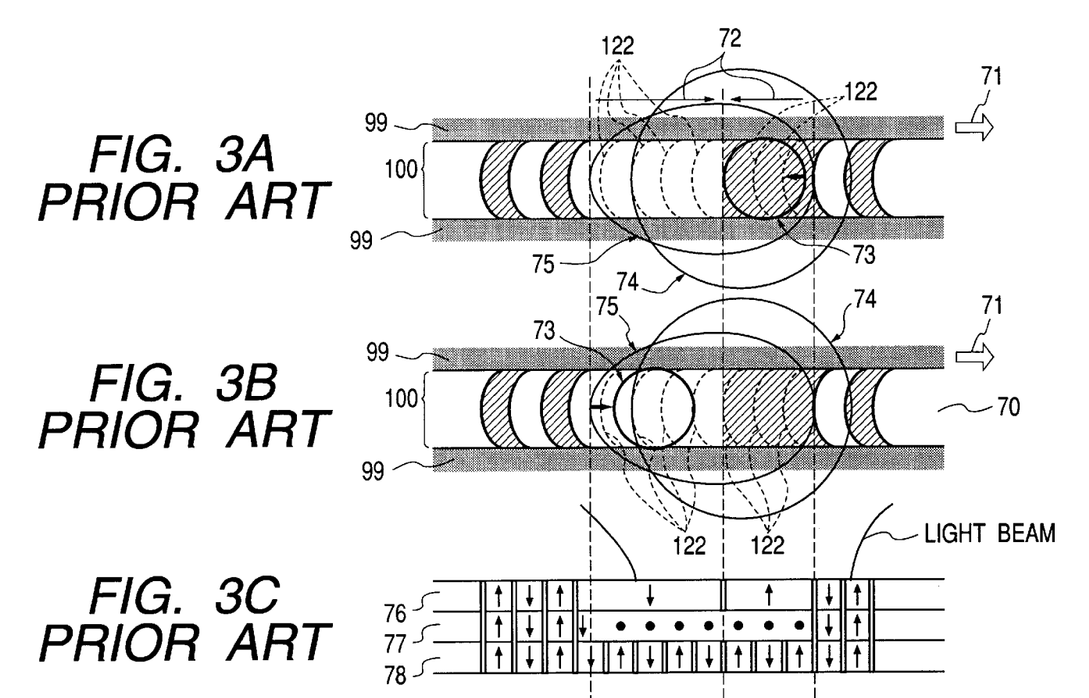
FIGS. 3A, 3B, 3C and 3D show the principle of operation of a conventional magneto-optical recording-reproducing apparatus.
Figure 3D:
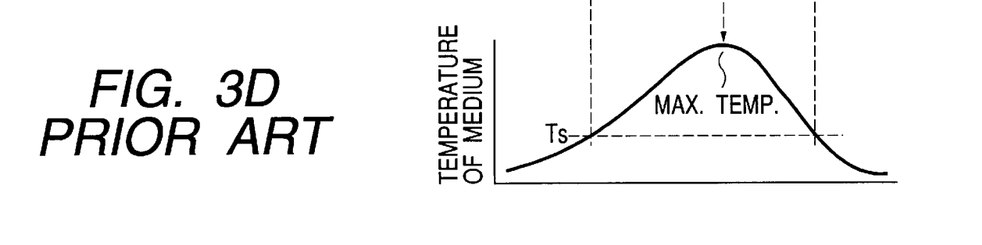

The laser beams of 680 nm and 1.3 $\mu$m emitted respectively from semiconductor lasers 7,8 for recording-reproducing and heating are introduced through collimator lenses 9,10, dichroic mirror 11, beam splitter 12, and condenser lens 6 to magneto-optical disk 1. Condenser lens 6 moves in the focusing direction and the tracking direction under control by actuator 5 to focus the laser beams successively on magneto-optical layer 3 by tracking along a guiding groove formed on magneto-optical disk 1. The light flux of 1.3 $\mu$m is made smaller than the aperture diameter of condenser lens 6 to make the NA smaller than that of the light of 680 nm which is condensed through the entire area of the aperture. The heating spot, which is formed with a larger wavelength and a smaller NA, has a larger diameter of heating beam 74 than the recording-reproducing spot of recording-reproducing beam 73 as shown in FIGS. 3A and 3B. Thereby, a desired temperature gradient is produced in the recording-reproducing spot region on the moving disk face as shown in FIG. 3D. Numeral 75 indicates a Ts isotherm. The laser beam reflected by magneto-optical disk 1 is deflected by beam splitter 12 to the optical path toward polarized light beam splitter 15, and travels through dichroic mirror 13, $\lambda/2$ plate 14, and polarized light beam splitter 15. The split light beams are respectively condensed by lenses 16 onto sensors 17 corresponding to magnetization polarity of the spot on the magneto-optical layer. The condensed light beams are composed only of 680 nm light since dichroic mirror 13 intercepts the 1.3 $\mu$m light. The outputs from the respective photosensors 17 are amplified differentially by differential amplifier 18 to output the magneto-optical signals. Controller 20 receives information on rotation rate of magneto-optical disk 1, recording radius, recording sectors, and so forth and outputs recording power, and recording signals to control LD driver (laser diode driver) 19, and magnetic head driver 24. LD driver 19 drives semiconductor lasers 7,8 In this example, LD driver 19 controls recording power, reproducing power, and heating beam power.

Magnetic head 23 applies a modulation magnetic field onto the laser irradiation spot on magneto-optical disk 1 for the recording operation. Magnetic head 23 is placed in opposition to condenser lens 6 with interposition of magneto-optical disk 1 During recording, recording-reproducing semiconductor laser 7 applies recording laser power by DC (direct current) light irradiation, and synchronously magnetic head 23 produces magnetic fields of different polarities under control by magnetic head driver 24 in correspondence with the recording signals. Magnetic head 23 moves with the optical head in a radius direction of the magneto-optical disk 1, and applies a magnetic field successively on recording onto the laser irradiation site of magneto-optical layer 3.

The recording-reproducing operation is explained by reference to FIGS. 2A to 2F. FIG. 2A shows recording signals, FIG. 2B a recording power, FIG. 2C modulating magnetic fields, FIG. 2D record marks, FIG. 2E reproducing signals, and FIG. 2F binary signals. In recording of the recording signals as shown in FIG. 2A, the power of the semiconductor laser is controlled to be at a prescribed level with the start of the recording operation, and a modulating magnetic field is applied in accordance with the recording signals. Thereby, record marks are formed in sequence in the process of cooling of the memory layer as shown in FIG. 2D, where the line-shadowed portions are magnetic domains magnetized in the direction corresponding to the record marks in the present invention, and the white blank portions are magnetic domains magnetized in the reverse direction thereto.

The portion of the guiding groove (hereinafter referred to as a groove) of the magneto-optical disk 1 is preliminarily annealed at a high temperature by projection of a laser beam to modify the portion of the recording medium layer so that the domain wall of the record mark will not form a closed loop, or a closed magnetic domain. This treatment facilitates the displacement of the domain walls.

The reproduction operation is explained below by reference to FIGS. 3A to 3D, wherein numeral 76 denotes a displacement layer, 77 a switching layer, 78 a memory layer, 99 a groove, 100 a land, and 70 a magnetic domain pattern of the displacement layer 76. The thin dotted line 122 represents the domain wall existing only in the memory layer. The displacement layer is heated by a heating beam 74 up to a temperature for causing the displacement of the domain wall in the displacement layer of the medium. The isotherm 75 of the temperature Ts of the recording medium, which is the main factor for inducing displacement of the domain wall, crosses the beam movement direction 71 in the forward portion and in the backward portion of the beam spot. The domain walls can displace backward from the front side and forward from the back side of the beam movement direction as shown by numeral 72 in FIG. 3A. Therefore, the magnetic displacement signals from the front side only can be detected by placing record-reproducing beam 73 only at the front side of the beam-moving direction as shown in FIG. 3A. Similarly, the magnetic displacement signals from the back side only can be detected by placing record-reproducing beam 73 at the back side of the beam-moving direction as shown in FIG. 3B.

Figure 2D:
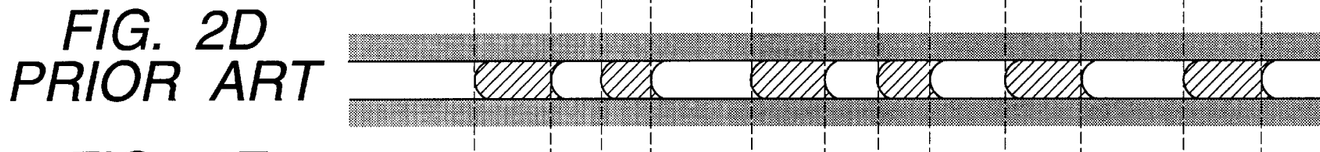
Figure 2E:
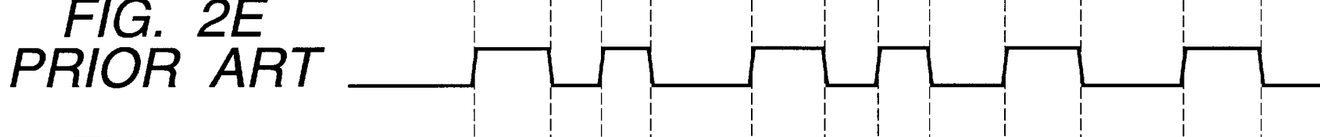
Figure 2F:
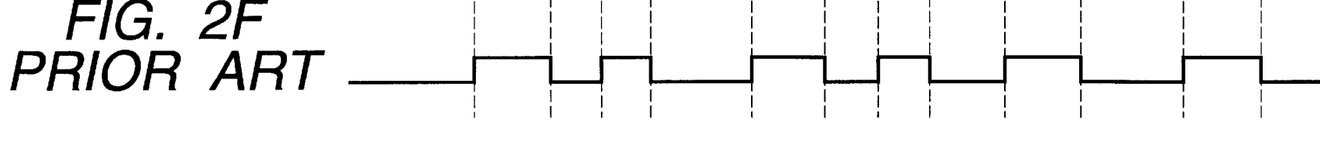

In either case, the record mark sequence as shown in FIG. 2D is reproduced by the record-reproducing beam to obtain reproduced signals (FIG. 2E), and further to obtain binary signals (FIG. 2F). In the above magneto-optical recording-reproducing method, a light beam is projected to cause displacement of the domain walls of the record marks in the displacement layer by utilizing a temperature gradient caused by the light beam without a change of the recorded data in the memory layer, and the change of the polarization direction of the reflected light beam is detected to reproduce the record marks. According to this magneto-optical recording-reproducing method, the magnetization states carried by the reproducing beam are all equal as shown in FIGS. 3A and 3B. Therefore, the reproduced signals are rectangular, and record marks of less than a diffraction limit of the optical system can be reproduced without decreasing the reproducing signal amplitude. Thereby, a medium and a method for magneto-optical recording can be provided which have been improved in recording density and transfer rate.

However, the prior art described above has disadvantages of high cost owing to many optical parts for the heating laser beam, various adjustment steps in assemblage of the apparatus, and two laser systems. For solving the problems of the high cost, the heating and reproduction are required to be conducted with one light beam system.

Figure 4A:
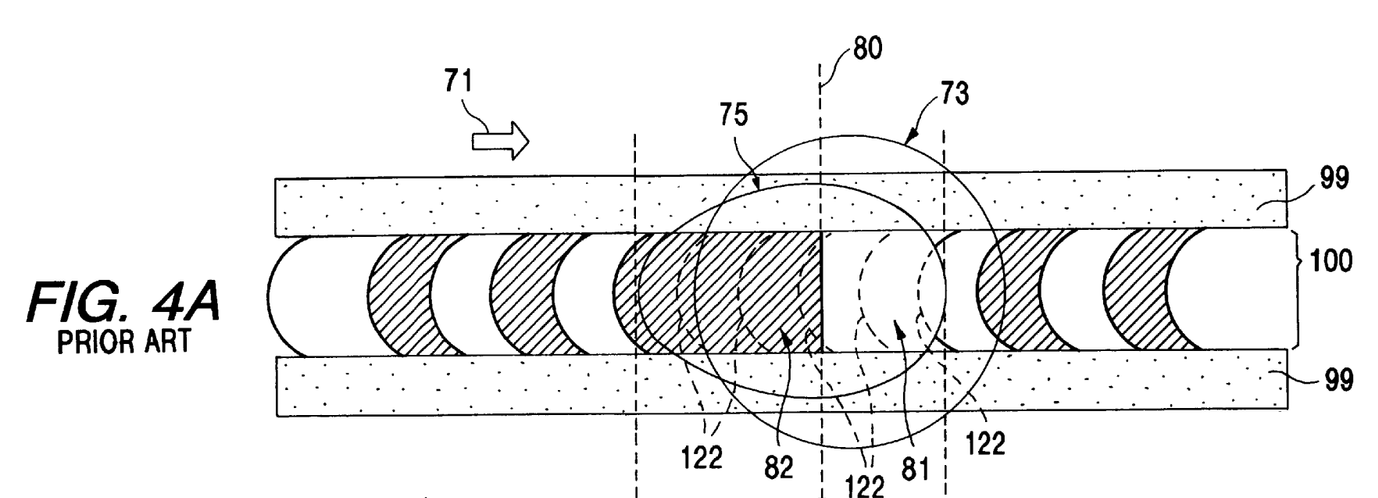
FIGS. 4A and 4B show the disadvantages of a conventional method.
Figure 4B:
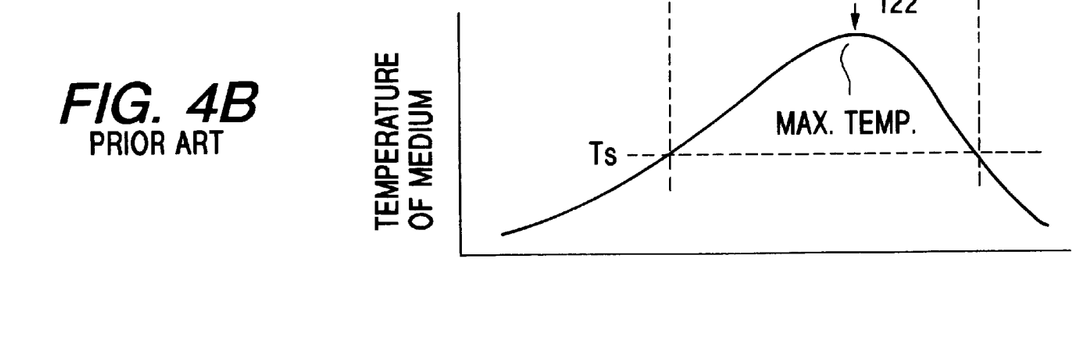

In the case where the heating beam is not employed, the maximum temperature point in the high temperature region formed by light beam lies within the irradiation area of the light beam as shown in FIGS. 4A and 4B. The thin dotted line 122 represents the domain wall existing only in the memory layer in FIG. 4A. In this case, the reproduced signal is a synthesized signal formed from two signals: a signal generated by displacement of the domain wall at the front portion of the beam movement direction toward the maximum temperature point by the temperature gradient, detected at region 81: $f(t)$ ($f(t)=0$ at $t<0$) where t is a time after a start of read-out of the record mark sequence and $t=0$ means the read-out start time; and another signal generated by displacement of the domain wall of the rear portion of the beam movement direction toward the maximum temperature point by the temperature distribution, detected at region 82: $\alpha \cdot f(t-\beta)$ ($f(t)=0$ at $t<0$). Therefore, the synthesized signal is represented by $h(t)=f(t)+\alpha \cdot f(t-\beta)$ where $\alpha$ is a coefficient for the read-out level for a signal from the front portion of the moving light beam, and $\beta$ is a time of delay of read-out.

Figure 5:
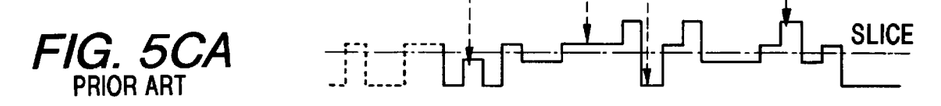
Figure 5A:
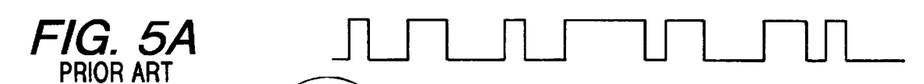
Figures 5B, 5B, 5B:
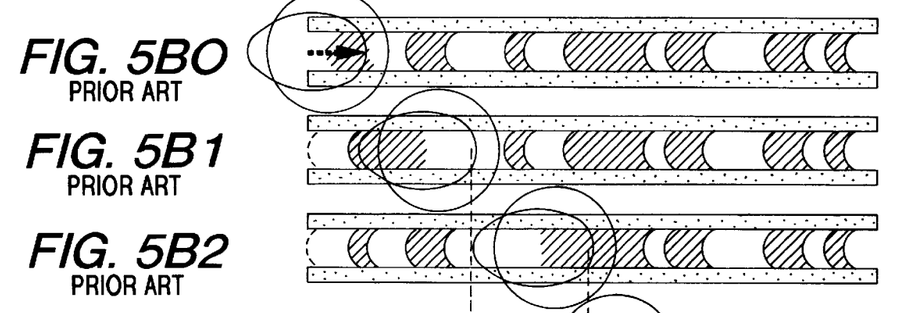
Figures 5B, 5B:
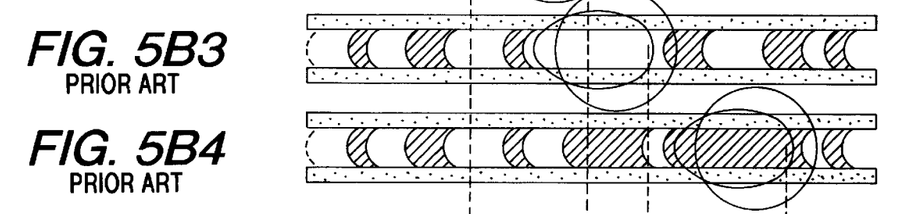

For example, when the recorded signal sequence shown in FIG. 5A is reproduced, the recorded signals are read out, with the movement of the reproduction beam, through the states shown in FIGS. 5B1 to 5B4 to give reproduced signals as shown in FIG. 5CA, which is superposition of the signals generated by domain wall displacement from the front side (FIG. 5CB) and the signals generated by domain wall displacement from the back side (FIG. 5CC) of the optical beam. Therefore, in this case, the recorded information cannot be reproduced with a sufficient margin by a conventional technique of slice-leveling and binarizing the median of repeated reproduction signals of shortest marks disadvantageously.

SUMMARY OF THE INVENTION

An object of the present invention is to provide a method for recording and reproducing information on or from a domain wall displacement type of a magneto-optical medium without the above disadvantages.

The method for recording information on a domain wall displacement type magneto-optical medium of the present invention comprises forming a magnetic domain such that the magnetic domain is asymmetrical with regard to a center line of a land portion or a groove portion in a tangential direction of the magneto-optical medium perpendicular to a radial direction of the magneto-optical medium.

The method for reproducing information recorded by the above method of the present invention comprises projecting a light spot, a center of which light spot is positioned in one side of the land portion or the groove portion divided by the center line of the land portion or the groove portion from the other side, in which other side a curvature center of a domain wall of the magnetic domain exists; moving the light spot along the land portion or the groove portion; and reproducing information from the magnetic domain by a change of polarization direction of a reflected light of the light spot.

BRIEF DESCRIPTION OF THE DRAWINGS

FIGS. 5A, 5B0, 5B1, 5B2, 5B3, 5B4, 5CA, 5CB and 5CC show the disadvantages of a conventional method.

DESCRIPTION OF THE PREFERRED EMBODIMENTS

Figure 6:
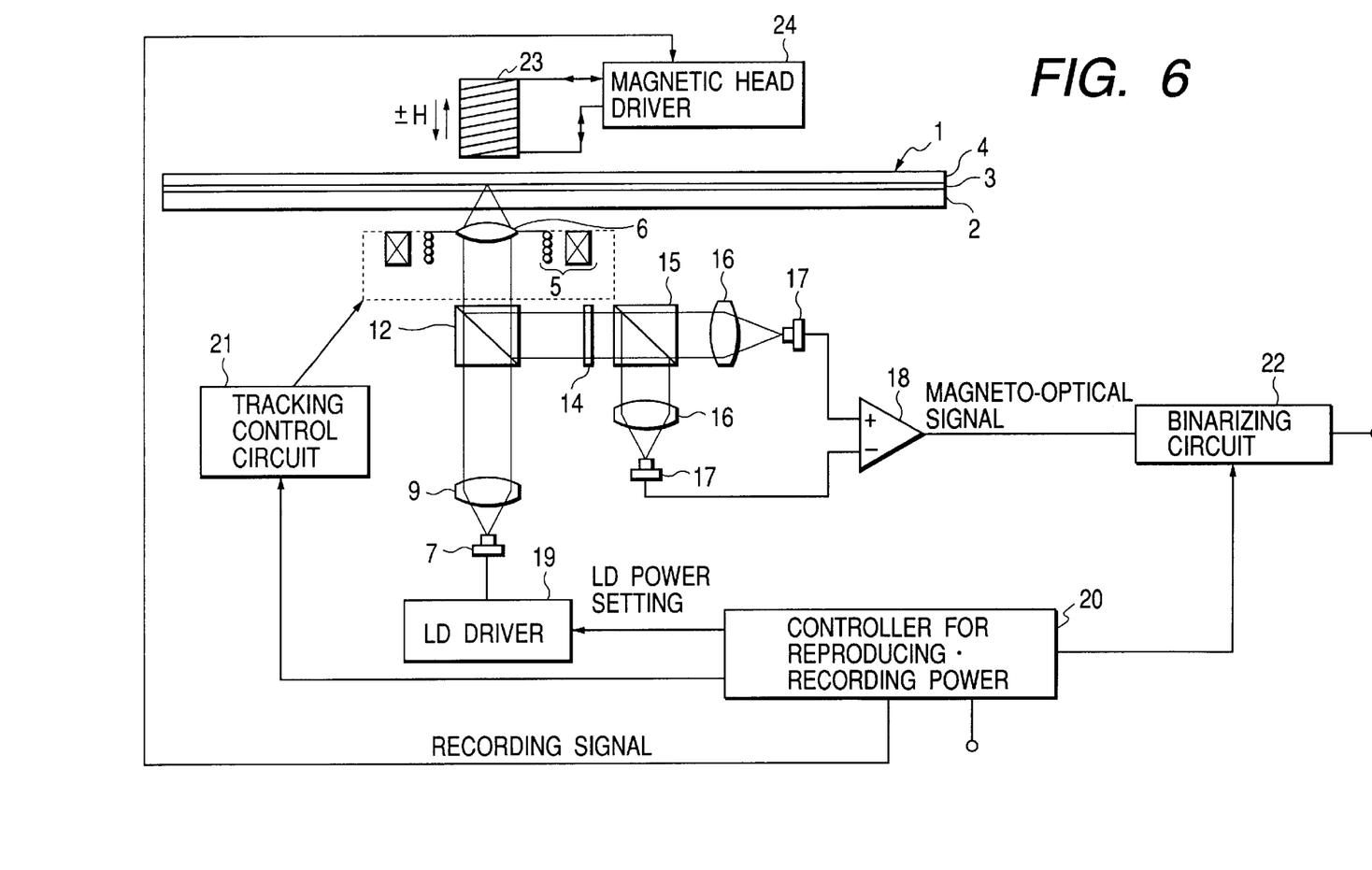
FIG. 6 shows a constitution of an embodiment of the present invention.

FIG. 6 shows a constitution of a magneto-optical recording-reproducing apparatus of a first embodiment of the present invention. In FIG. 6, magneto-optical disk 1 is constituted of substrate 2 made from glass or a plastic material, a magneto-optical layer 3 formed thereon, and a protection layer 4 formed further thereon. Magneto-optical layer 3 is constituted of layers comprising at least a memory layer, and a displacement layer. Magneto-optical layer 3 is capable of reproducing record marks of less than a diffraction limit of the optical system by causing displacement of a domain wall of a record mark in the displacement layer by utilizing a temperature gradient formed by light beam irradiation without a change of the recorded data in the memory layer, magnifying the magnetization in the reproducing spot, and detecting the change of the polarization direction of a reflected light beam. Magneto-optical disk 1 is held by a spindle motor by magnet chucking or a like means to be rotatable on a rotation axis.

Parts 5 to 7, 9, 12 and 14 to 17 constitute an optical head for projecting a laser beam to magneto-optical disk 1 and receiving information from reflected light. The parts comprise condenser lens 6; actuator 5 for driving condenser lens 6; semiconductor laser 7; collimator lens 9; beam splitter 12; λ/2 plate 14; polarized light beam splitter 15; photosensors 17; condenser lenses 16 for photosensors 17; and differential amplification circuit 18 for amplifying differentially the condensed and detected signals according to polarization directions. In the above constitution, the laser beam emitted from semiconductor laser 7 is projected through collimator lens 9 beam splitter 12 and condenser lens 6 onto magneto-optical disk 1. Condenser lens 6 moves in the focusing direction and the tracking direction under control of actuator 5 to focus the laser beam successively on magneto-optical layer 3 and tracks along a guiding groove on magneto-optical disk 1.

Tracking control circuit 21 and a focusing control circuit (not shown in the drawing) controls the focusing and the tracking. Tracking control circuit 21 gives also a prescribed tracking offset on recording and reproduction. The laser beam reflected by magneto-optical disk 1 is deflected by beam splitter 12 to the optical path toward polarized light beam splitter 15 and travels toward λ/2 plate 14 and polarized light beam splitter 15. The light beam is split by the polarized light beam splitter 15 and the split light beams are focused by condenser lenses 16 onto photosensors 17 respectively in accordance with the magnetization polarity of the spots on magneto-optical layer 1. The outputs from the respective photosensors 17 are differentially amplified by differential amplification circuit 18 to produce magneto-optical signals.

Controller 20 receives information on rotation rate, recording radius, and recording sectors of magneto-optical disk 1 start of the recording, start of reproduction, and so forth, and outputs recording power, and recording signals to control LD driver 19 magnetic head driver 24 tracking control circuit 21, and so forth. The offset of the tracking is controlled by this controller 20 LD driver 19 drives semiconductor lasers 7 to control the recording power and reproduction power as desired in this embodiment.

Magnetic head 23 applies a modulating magnetic field onto the laser irradiation spot on magneto-optical disk 1 in the recording operation. Magnetic head 23 is placed in opposition to condenser lens 6 with interposition of magneto-optical disk 1. In recording a signal onto magneto-optical disk 1 semiconductor laser 7 projects DC light as the recording laser power under control of LD driver 19 and synchronously magnetic head 23 produces magnetic fields of different polarities under control by magnetic head driver 24 in correspondence with the recording signals, the record mark being formed by a magnetic field modulation system. Magnetic head 23 moves with the optical head in a radial direction of magneto-optical disk 1, and applies a magnetic field successively onto the laser irradiation spot of magneto-optical layer 3 during recording.

Binarizing circuit 22 binarizes the magneto-optical signal produced by the displacement of a domain wall, caused by the light beam, from the front side of the critical temperature region for magnetic displacement to the maximum temperature point. The output therefrom is introduced to a PLL circuit, a modulation circuit, or the like not shown in the drawing.

The guiding groove portion of the magneto-optical medium preliminarily is modified by projection of laser light of a high power for high-temperature annealing of the portion of the recording medium so that the domain wall of the record mark will not form a closed loop, or a closed magnetic domain, whereby the displacement of the domain wall is facilitated.

The principle of operation of the present invention is described with the above constitution.

Figure 8:
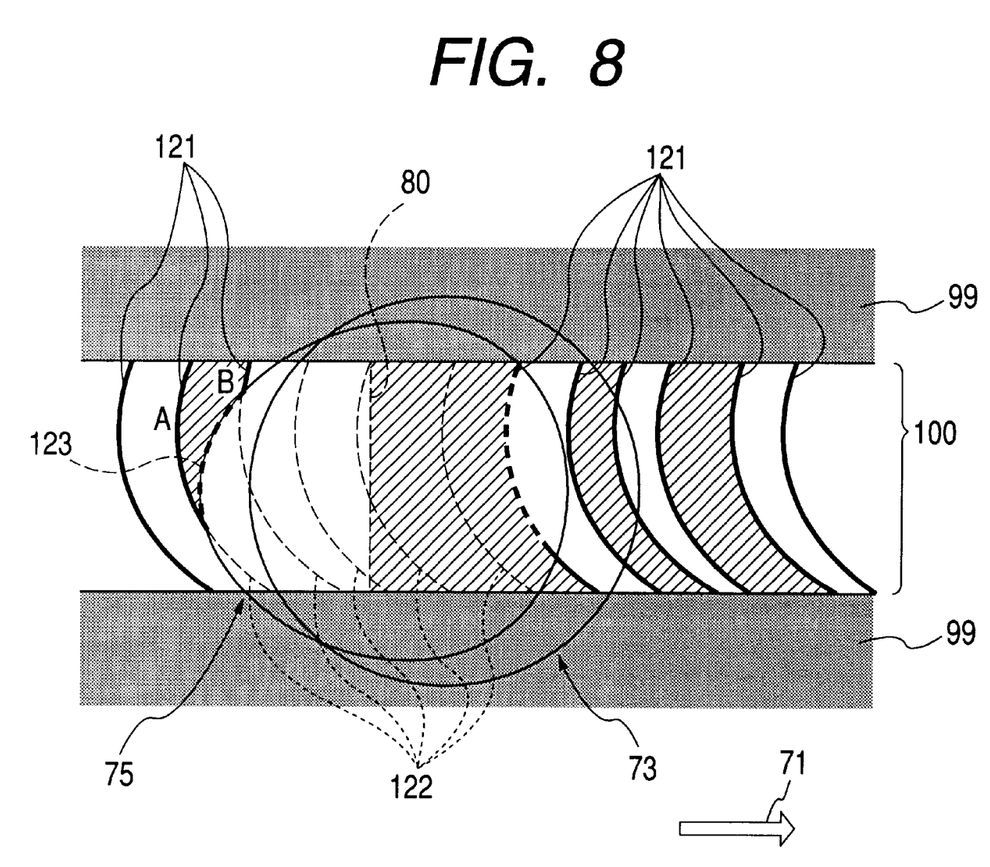
FIG. 8 shows the principle of operation of an embodiment of the present invention.

Firstly, the behavior of the reproducing signal in a domain wall displacing medium as the basis of the present invention and the principle of the present invention are explained by reference to FIG. 8, in which the record mark is recorded by a magnetic field modulation system as described above. FIG. 8 shows a temperature distribution caused by a reproducing light beam which is moving from the left to the right as shown by arrow 71 in the drawing. In FIG. 8, the Ts isotherm 75 indicates the line of the temperature for breaking the magnetic coupling between the memory layer for storing recorded information and the displacement layer capable of enlarging and reproducing a magnetic domain by displacing the domain wall. This temperature is the main factor for initiating the domain wall displacement. In principle, the domain wall will begin to be displaced when the domain wall is brought into this temperature range. The position of the Ts isotherm relative to the light beam spot depends largely on the thermal characteristics of the recording medium, and also on the relative speed (linear velocity) of the light beam to the recording medium. The domain wall having reached the Ts isotherm is displaced by the temperature gradient toward the maximum temperature point where it is most stable energetically. As shown in FIG. 8, the Ts isotherm for the domain wall displacement lies not only in the front side of the moving light beam but also in the back side thereof. The present invention intends to prevent the domain wall displacement at the Ts isotherm portion at the back side of the moving light beam.

The principle of operation of the present invention is described in more detail. FIG. 8 shows guiding groove 99 for tracking of the light beam, and land 100 for forming a recorded magnetic domain. The groove portion has preliminarily been modified by projection of laser light of a high power for high-temperature annealing of the portion of the recording medium so that the domain wall of the record mark will not form a closed loop, or a closed magnetic domain, whereby the ease with which the domain wall is displaced by a temperature gradient is improved and the domain wall is displaced at a higher speed. The record marks are formed in the land area between the grooves. In FIG. 8, the recording domain wall is formed in a shape asymmetrical with regard to a center line of the land in a tangential direction (horizontal, or right-to-left in the drawing) of the magneto-optical medium perpendicular to a radial direction (vertical, or top-to-bottom in the drawing) of the magneto-optical medium. The displacement behavior of the above recorded domain wall is explained for the reproduction operation.

In FIG. 8, a reproduction beam spot is indicated by numeral 73 and a Ts isotherm by numeral 75. Characteristically in the present invention, the reproduction beam spot is offset in the radial direction perpendicular to the tangential direction, in one side of the land portion divided by the center line of the land from the other side thereof, in which other side a curvature center of the arc-shaped recorded domain wall exists, as shown in FIG. 8. The reproduction light beam, which is DC irradiation in this embodiment, moves forward to the right direction in the drawing in this state. The Ts isotherm is one of the isothermal lines showing the temperature distribution of the recording medium heated by irradiation of the reproduction light irradiation, showing the critical points as the important condition for starting the movement of the domain wall in the displacement layer. When the light beam has moved to come to enclose most of a domain wall with the Ts isotherm, the domain wall in the displacement layer is displaced quickly to the domain wall displacement end point 80. Thereby, the reproduced signal quickly rises or quickly falls. Thus, by the domain wall displacement-reproduction method based on the present invention, the reproduction signal changes in a rectangle waveform in accordance with the change of the recorded magnetic domain, namely the change of the polarization direction. The domain wall in the memory layer is retained stably without destruction regardless of the presence or absence of the reproduction light beam. Thick line 121 in the drawing represents a domain wall in the layer when the memory layer and the displacement layer are coupled by exchange coupling. The thin dotted line 122 represents the domain wall existing only in the memory layer. The thick dotted line 123 represents the domain wall existing only in the displacement layer.

Next, the principles are explained for re-coupling of the domain walls and for suppression of displacement of the domain wall in the Ts isotherm region at the back side of the light beam movement. The domain wall in the memory layer having passed through the Ts isotherm at the back side of the light beam begins to form an (N−1)th domain wall (Point A in FIG. 8) by exchange coupling in the displacement layer. If the direction of magnetization inside the Ts isotherm region in the back side of the light beam movement direction is reverse to the direction of the magnetization of re-coupling, the domain wall cannot be exist independently. Therefore, simultaneously with the formation of the (N−1)th domain wall, the domain wall is formed which exists only in the displacement layer along the Ts isotherm as shown by a thick dotted line 123 in FIG. 8. Here, the usual relation between the (N−1)th domain wall and the Ts isotherm is explained below. In usual systems, the (N−1)th domain wall and the Ts isotherm are nearly in a parallel state. Therefore, nearly simultaneously with the re-coupling of the (N−1)th domain wall, a domain wall is formed in a full breadth of the land on the Ts isotherm, and is displaced instantaneously to the displacement end point. Thereby, the signal produced by the domain wall displacement at the back side of the light beam movement direction is superposed onto the reproduction signal as mentioned above as the problem. On the other hand, according to the present invention, the subsequent domain wall (N-th wall) existing in the memory layer re-couples with the displacement layer to form a domain wall (Point B in FIG. 8) before the domain wall on the Ts isotherm in the displacement layer spread in a full breadth of the land. Accordingly, the domain wall formed in the vicinity of the Ts isotherm in the displacement layer is in a shape of a loop constituted of the (N−1)th domain wall, the domain wall formed on the Ts isotherm, and the N-th domain wall. The domain wall formed thus is confined by a stronger coercive force in comparison with a conventional one formed in an arc shape in a full breadth of the land in the displacement layer, so that the domain wall formed on the Ts isotherm in the displacement layer is fixed without causing displacement toward the displacement end point. Consequently, the superposition of the signal is prevented which is caused by the signal caused by the domain displacement at the back side of the light beam movement, and only the signal produced by the magnetic displacement at the front side of the light beam movement.

Figure 9:
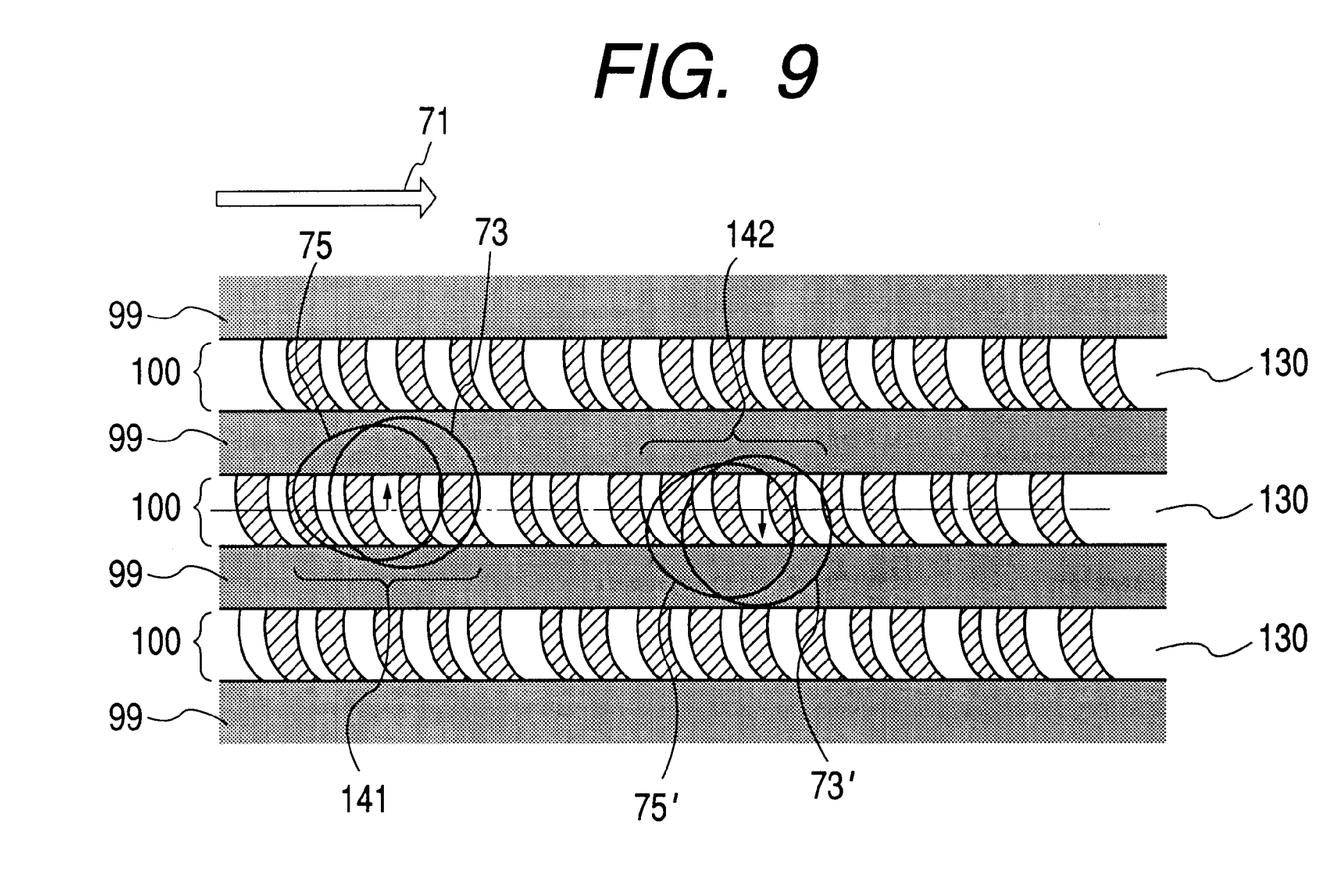
FIG. 9 shows the principle of operation of another embodiment of the present invention.

FIG. 9 shows a method for formation of a recording domain wall in a radial direction in the asymmetrical shape with regard to the center line of the land in the tangential direction perpendicular to the radial direction, and for offsetting of the domain wall in the information reproduction relative thereto. FIG. 9 shows grooves 99 for guiding tracking of the light beam, lands 100 for recording record marks, and record mark sequences 130 showing further the relative positions of recording optical beam 73 for recording the record mark sequence to the land group of the recording temperature isotherm 75 and the relative positions of reproducing light beam 73' and Ts isotherm 75' to the land group, tracking state 141 of the light beam and thermal distribution during recording, and tracking state 142 thereof during reproduction.

For forming a recording domain wall in the radial direction in the asymmetrical shape with regard to the center line of the land in the tangential direction perpendicular to the radial direction, the recording is conducted by offsetting the light beam in the radial direction, upward in FIG. 9. Since the guiding groove portion has been modified by high-temperature annealing by irradiation of a high-power laser beam, the magnetic domain is not formed on the groove. Therefore, the domain wall can be formed in a radial direction (vertical in the drawing) in an asymmetrical shape with regard to the tangential center line (lateral direction in the drawing) of the land.

The reproduction is conducted with a light beam offset in a direction reverse to the offsetting direction at the recording operation. Thereby, as explained by reference to FIG. 8, the re-coupling of the N-th domain wall is allowed to begin before the re-coupling of the (N−1)th domain wall is completed to prevent the domain wall displacement at the back side of the light beam movement.

In the above description regarding FIG. 9, the light beam is offset both in recording and in reproduction, but is not limited thereto. The offsetting only in recording or in reproduction is sufficient, provided that the re-coupling of the N-th domain wall is allowed to begin before the (N−1)th domain wall re-couples completely with the displacement layer. Although in the above description regarding FIG. 9, the light beam is offset in the upside direction receding from the tangential center line during the recording and in the downside direction receding therefrom during the reproduction as shown in FIG. 9, the directions may be reversed. Furthermore, the method is not limited to the tracking offset, provided that the relation of the recorded domain wall with the reproduction light beam and Ts isotherm is retained such that the re-coupling of the N-th domain wall is allowed to begin before the (N−1)th domain wall re-couples completely in the displacement layer.

Figure 7A:
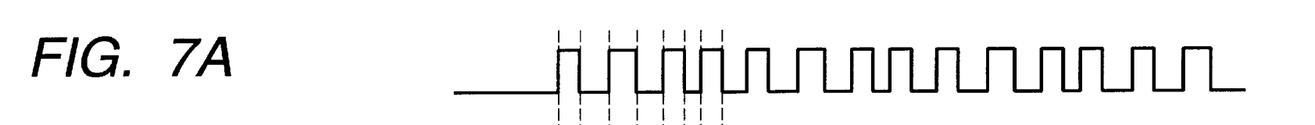
FIGS. 7A, 7B, 7C, 7D and 7E are timing charts for explaining operation of an embodiment of the present invention.
Figures 7B, 7C:
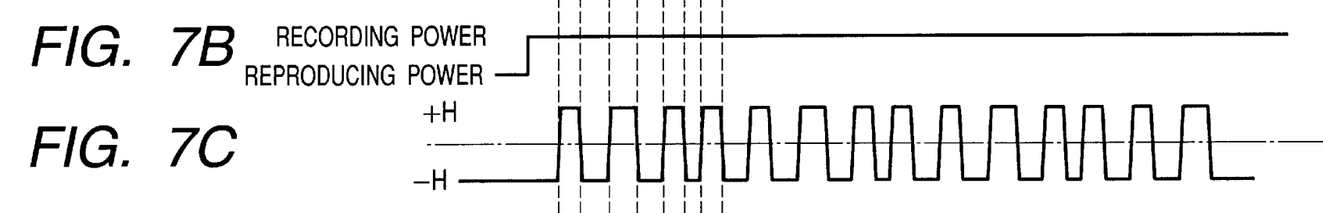
Figure 7D:
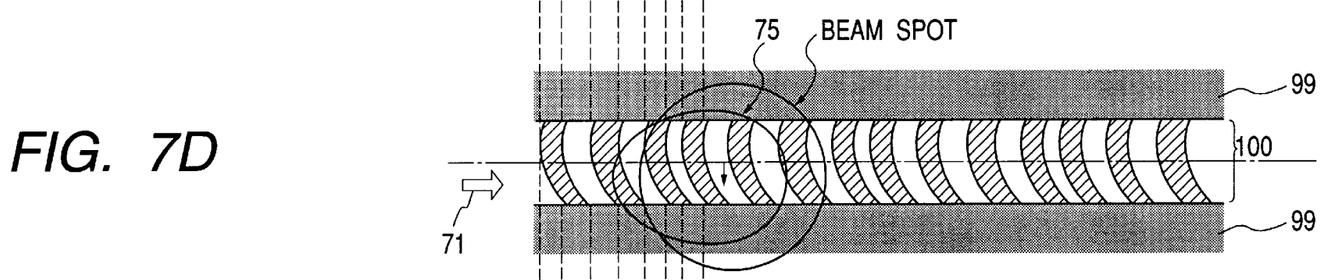
Figure 7E:
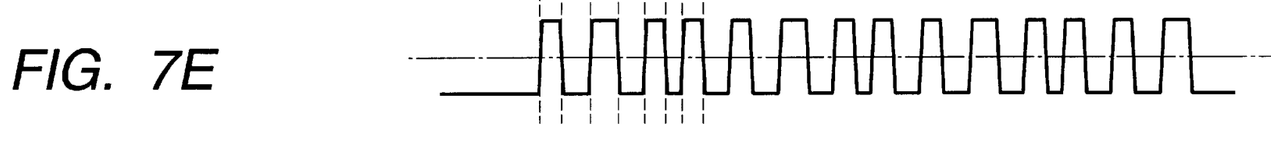

Practical recording and reproduction of information are explained for the constitution and the principles described above by reference to timing charts of FIGS. 7A to 7E. FIG. 7A shows a recorded data sequence of the recording signal system. FIG. 7B shows recording power. FIG. 7C shows a modulating magnetic field. FIG. 7D shows a record mark sequence having an offset. FIG. 7E shows reproduced signals.

With a start of recording, the laser power is controlled to be at a prescribed recording level, and a modulation magnetic field (FIG. 7C) is applied in accordance with the record signal. In the recording, the tracking is offset to be at the upside in the radial direction of the tangential center line. By these operations, a sequence of record marks (FIG. 7D) is formed at the cooling step after passage of the light beam on the recording medium. Domain walls of the record mark sequence are formed radially and asymmetrically with regard to the center line of the land. The line-shadowed portion of the record mark sequence (FIG. 7D) shows a magnetic domain of a magnetization direction of a record mark mentioned in this patent specification, and the white-blank portion shows a magnetic domain magnetized in the reverse direction thereto. The groove portions along the both sides of the land have been annealed at a high temperature by laser power so that the groove portion of the recording medium has been denatured to lose the inherent properties thereof.

In reproduction of the record mark sequence, tracking is offset to be at the downside of the center line in the radial direction. The reproduction is conducted by a magneto-optical recording-reproduction method according to the present invention to obtain a reproduction signal as shown in FIG. 7E. In this magneto-optical recording-reproduction method, a domain wall of a record mark in the displacement layer is displaced without changing the recorded data by utilizing a temperature gradient of the temperature distribution caused by temperature characteristics of the magneto-optical medium and the magnetic domain, and the change of the polarization direction of reflected light of the light beam is detected, to obtain the record signal. The rise and fall of the reproduction signal (FIG. 7E) is sharp because the displacement of the domain wall is sufficiently rapid in comparison with the movement of the magneto-optical disk. As described above, the present invention achieves the advantageous effect that the re-coupling of the N-th domain wall to the displacement layer begins in the vicinity of the Ts isotherm in the back side of the reproduction beam movement direction prior to the completion of the re-coupling of the (N−1)th domain wall thereto. By this effect, the domain wall displacement from the Ts isotherm at the back side is prevented, and only the signal of the domain wall displacement from the front side of the reproduction beam constitutes the reproduction signal.

The reproduced signals obtained in the present invention can be a converted reproduction data sequence by binarization according to a conventional technique such as edge detection by level slice, and channel sampling detection to obtain a reproduced data sequence.

Although this embodiment is described for magnetic field modulation recording with DC laser light beam irradiation, the recording method is not limited thereto. The invention of the present invention is applicable to magnetic field modulation recording with magnetic field modulation plus pulse laser beam irradiation, or optical modulation recording by creating the state in which re-coupling of the N-th domain wall to the displacement layer begins before completion of the re-coupling of the (N−1)th domain wall thereto.

The present invention enables omission of the heating beam and related parts, decrease of the steps of the apparatus assemblage, and cost saving with the one laser system.

In a usual one-beam reproduction system, as described above and shown in FIGS. 4A and 4B, the reproduced signal is a synthesis signal composed of a signal produced by displacement of a domain wall at the critical displacement temperature region from the front side of the light beam movement direction (arrow mark direction in FIG. 4A) to the maximum temperature point, and another signal produced by displacement of a domain wall at the critical displacement temperature region from the back side of the light beam movement direction to the maximum temperature point. Thus, the conventional one-beam reproduction system has a disadvantage that recorded information cannot be reproduced with a sufficient margin by a usual technique of slice-leveling of minimum mark repetition amplitudes and binarizing the median. The present invention overcomes such a disadvantage.

The present invention provides a method and an apparatus which prevents, in reproduction of signals by a one-beam reproduction system, the displacement of a domain wall, in a critical temperature region formed by a reproduction light beam, from a backside of the light beam movement direction to the maximum temperature point, thereby producing only the reproduction signals given by displacement of the domain walls from the front side of the light beam movement direction to the maximum temperature point without the superposition of signals. Thus, the present invention provides a method and an apparatus for reproducing recording information precisely by a conventional binarization technique.

What is claimed is:

1. A method for recording information on a domain wall displacement type magneto-optical medium, said method comprising:

forming a magnetic domain such that the magnetic domain is asymmetrical with regard to a center line of a land portion or a groove portion in a tangential direction of the magneto-optical medium perpendicular to a radial direction of the magneto-optical medium.

2. The method for recording information according to claim 1, wherein the magnetic domain is formed by joint action of a light spot and an external magnetic field.

3. The method for recording information according to claim 2, wherein the magnetic domain is formed by de-tracking of the light spot from the land portion or the groove portion.

4. The method for recording information according to claim 3, wherein the de-tracking of the light spot is conducted by applying an offset to tracking control of the light spot.

5. A method for reproducing information recorded on a domain wall displacement type magneto-optical medium by forming a magnetic domain such that the magnetic domain is asymmetrical with regard to a center line of a land portion or a groove portion in a tangential direction of the magneto-optical medium perpendicular to a radial direction of the magneto-optical medium, said method comprising:

projecting a light spot, a center of which light spot is positioned in one side of the land portion or the groove portion divided by the center line of the land portion or the groove portion from the other side, in which other side a curvature center of a domain wall of the magnetic domain exists;

moving the light spot along the land portion or the groove portion; and reproducing information from the magnetic domain by a change of polarization direction of reflected light of the light spot.

* * * * *

UNITED STATES PATENT AND TRADEMARK OFFICE
CERTIFICATE OF CORRECTION

PATENT NO.   : 6,069,852
DATED        : May 30, 2000
INVENTOR(S)  : Yasuyuki Miyaoka, et al.

It is certified that error appears in the above-identified patent and that said Letters Patent is hereby corrected as shown below:

REFERENCES [57]
Line 11, "spot" (first occurrence) should read --spot,--; and "spot," (second occurrence) should read --spot--.

COLUMN 3
Line 5, "disk 1" should read --disk 1.--.

COLUMN 4
Line 43, "is" should read --is a--.

COLUMN 8
Line 17, "be" should be deleted.

COLUMN 9
Line 59, "the" (second occurrence) should be deleted.

Signed and Sealed this

Twelfth Day of June, 2001

*Attest:*

Nicholas P. Godici

NICHOLAS P. GODICI
*Attesting Officer*  *Acting Director of the United States Patent and Trademark Office*